Nov. 11, 1958     M. R. BOYD ET AL     2,859,571
METHOD OF MANUFACTURING VACUUM ENCLOSURES
Filed May 31, 1957
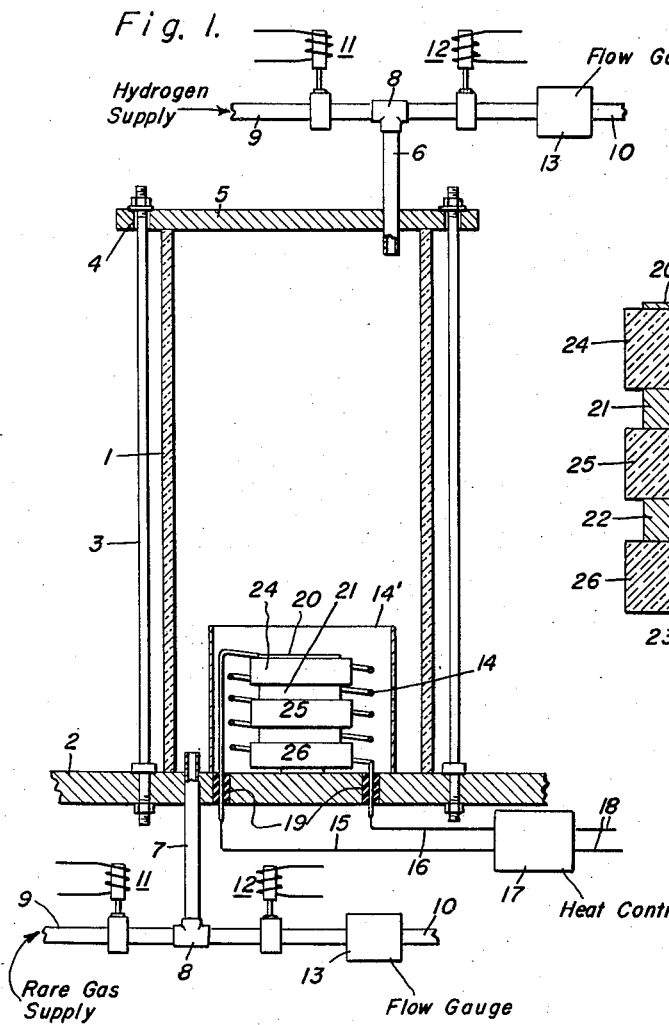
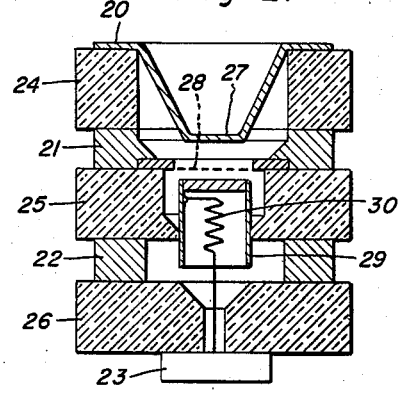
Inventors:
Malcolm R. Boyd;
Billy D. McNary,
by Richard R. Brainard
Their Attorney.

United States Patent Office 2,859,571
Patented Nov. 11, 1958

2,859,571

METHOD OF MANUFACTURING VACUUM ENCLOSURES

Malcolm R. Boyd, Schenectady, and Billy D. McNary, Altamont, N. Y., assignors to General Electric Company, a corporation of New York Application May 31, 1957, Serial No. 662,932

5 Claims. (Cl. 53—4)

The present invention relates to improved methods of manufacturing vacuum enclosures particularly of the type employed in electric discharge devices.

In copending DeSantis et al. application Serial No. 631,321, filed December 28, 1956, entitled Evacuated and Gas-Filled Devices and Methods of Manufacturing and assigned to the assignee of this application, is described and claimed an improved method of manufacturing vacuum devices in which the device includes a metal of the titanium group. In one disclosed form the device is heated up and degassed within a dry hydrogen atmosphere and then the parts sealed together to form a vacuum-tight envelope with a quantity of hydrogen contained within it. At the elevated temperature the material of the titanium group irreversibly sorbs active gases other than hydrogen. Thereafter the device is cooled and the hydrogen is sorbed by the metal of the titanium group to reduce the pressure at moderate operating temperatures to a value such as $10^{-7}$ millimeters of mercury which is satisfactory for many vacuum devices.

While the method described above is satisfactory for making electric discharge devices with a pressure of the order of $10^{-7}$ millimeters of mercury the quantity of gas sorbed by the titanium, or similar metal, may tend to render it structurally weak and if converted to a hydride it may even be converted to a powder. If the titanium or similar metal is a structural part of the device this destroys the mechanical strength of the envelope. Also, under some circumstances, it is difficult to realize as low a pressure within the device as desired particularly for devices for operation at elevated temperatures.

In accordance with the present invention, after the device has been sealed in a hydrogen atmosphere at an elevated temperature the temperature is dropped slightly and then the surrounding atmosphere changed from hydrogen to that of an inert gas by flushing the enclosure within which the device is sealed. The hydrogen in the surrounding atmosphere in this way is reduced substantially to a trace and the partial pressure of the hydrogen is very slight. Under these conditions, and at an elevated temperature, hydrogen within the envelope passes through the wall portion of the titanium group metal to reduce the amount of hydrogen trapped within the envelope to a very small amount. The titanium upon cooling sorbs the residual hydrogen, reduces the pressure to a very low value without loss of its mechanical properties.

Accordingly, it is an important object of the present invention to provide an improved method of manufacturing evacuated enclosures which includes removing from the interior of the enclosure a quantity of hydrogen previously trapped within the enclosure by passing it through a pervious wall of the envelope.

Further objects and advantages will become apparent as the following description proceeds, reference being had to the accompanying drawing and its scope will be pointed out in the appended claims. In the drawing Figure 1 is schematic representation of apparatus for carrying out our invention; and Figure 2 is an elevational view in section showing an electric discharge device of a type suited for manufacture in accordance with our improved method.

In Figure 1 of the drawing the apparatus is essentially a furnace which may be flushed selectively with dry hydrogen and a rare gas such as argon and within which a vacuum enclosure such as an electric discharge device may be heated to the desired temperature schedule for purposes of degassing the parts and sealing the envelope together. In the embodiment shown, the furnace includes a glass cylinder 1 supported from a planar support 2. The cylinder 1 may be clamped in position by means of bolts 3 secured to the plate 2 and extending through hole 4 in an upper plate or enclosure 5. The upper and lower plates are each provided with a passage to which conduits 6 and 7 are connected. Each conduit is provided with a T fitting 8 to provide branch lines 9 and 10. In each of the branch lines 9 a solenoid operated valve 11 is provided for the purpose of controlling the supply of gas to the conduits 6 and 7. Each of the branch conduits 10 is provided with a solenoid valve 12 for selectively turning off this passage and with an output or flow gauge 13 for measuring the rate of flow through the branch conduits 10. As indicated in the drawing, the upper conduit 9 provides a source of dry hydrogen and the lower conduit 9 provides a source of rare gas such as argon. The operating coils of the solenoid valves 11 and 12 may be connected together in a suitable control circuit (not shown) so that the hydrogen supply conduit 9 at the top of the furnace is open and the output gauge at the bottom of the furnace is open to establish a flow of dry hydrogen through the furnace, or, these two passages are closed and the argon supply conduit 9 at the bottom of the furnace is open and the output conduit 10 at the top of the furnace is open to provide for the flow of argon through the furnace. Provision may also be made for opening all four valves at one time to completely flush air from the system.

Means for heating the envelope to be sealed and evacuated are provided by a tungsten coil illustrated by the numeral 14 and connected by conductors 15 and 16 to a suitable heat control illustrated diagrammatically at 17 and which is, in turn, energized from a suitable alternating current source 18. It will be understood that the conductors pass through the plate 2 by means of suitable insulating bushings 19. The coil 14 may be surrounded by a suitable cylindrical heat shield or oven 14'.

Before describing the operation of the apparatus described above in carrying out our invention it is desirable to consider briefly the structure of an electric discharge device suitable for evacuation in accordance with our invention. In Figure 2 such a device is shown as comprising metal terminals 20, 21, 22 and 23 and ceramic spacers 24, 25 and 26 arranged in a stack with the insulators 24, 25 and 26 interposed between adjacent metal terminal members. The terminal 20 may be formed integral with a disc-shaped anode 27. The terminal 21 provides a grid terminal and is electrically connected with a planar grid 28; terminal 22 is a cathode terminal and is electrically connected with a cathode sleeve 29 while the terminal 23 is electrically connected with one terminal of a filamentary heater 30. The other terminal of the heater 30 is connected with the cathode sleeve 29.

In accordance with the present invention the metal members, or at least one part of the wall of the discharge device, are composed of a metal of the titanium group which, for the purpose of this invention, includes an addition to titanium; zirconium, hafnium, thorium, palladium and vanadium. In a specific device which may be made to advantage by the method of our invention, the members 20—26, inclusive, are titanium metal and are arranged in a stack with a nickel shim or washer interposed between each metal member and the adjacent ceramic member. This stack assembly is positioned in the furnace of Figure 1 with the parts gently urged together as by a small weight. If desired, one or more of the washers of nickel may be corrugated to facilitate the passage of gas into and out of the enclosure. After the envelope has been positioned within the coil 14 of Figure 1 the cylinder 1 and upper plate 3 are placed in position and secured there by the bolts 3.

The following is a specific example of the process in accordance with the present invention applied to an electric discharge device in which the terminal members are of titanium and the seal between the metal members and the ceramic members are made by means of nickel shims which alloy with the titanium to form a reactive alloy in accordance with the method described and claimed in copending Beggs application Serial No. 409,159, filed February 9, 1954, entitled Metallic Bond and assigned to the assignee of this application. After the tube is in position within the cylinder 1 and coil 14 the cylinder is flushed with both hydrogen and argon to be sure that the equipment is free of entrapped air. The argon is then turned off and the hydrogen allowed to flow at the rate of approximately 50 cubic centimeters per minute for a period of approximately 10 minutes. Current is then supplied to the heating coil 14, preferably the temperature is raised in four steps to about 950° C., with each level of energization of the heating coil being held for a period of about 3 minutes. During this time the interior of the tube envelope is thoroughly flushed with dry hydrogen, the products are degassed and the cathode, if it is coated with an oxide, is activated. All of the gases liberated during these processes are flushed away. The temperature is then raised to about 1035° C. and held for a period of about 3 minutes at which time the reactive alloy is formed at the joints between the metal and the ceramic parts. The energization of the heating coil is then reduced to allow the tube to cool to approximately 950° C. to solidify the joints. This is preferably accomplished rather quickly, for example, in a period of one or two minutes. By operation of the solenoid valves the hydrogen line at the top of the furnace and the outlet at the bottom are shut off and the argon supply line at the bottom of the furnace and the outlet at the top are opened to establish a flow of argon through the furnace at substantially 50 cubic centimeters per minute. For a given heat input the temperature will tend to rise in the presence of argon as compared with hydrogen so that it is desirable to maintain the same temperature by reducing the input to the heating coil 14. The argon is allowed to flow over the device while maintaining the temperature at about 950° C. for a period sufficient to allow the hydrogen to pass through the wall portion of the envelope composed of the titanium or similar metal may be about fifteen minutes, for example. The time may vary from a minute or two up to an hour, the length of time depending upon the thickness and area of the wall metal as well as the temperature and the pressure of residual hydrogen within the envelope which is desired to obtain. The higher the temperature the faster the gas tends to pass through the metal wall. In the above example of the method of our invention the glass cylinder of the furnace was 6" in diameter and about 12" long. The discharge device had a total volume of about one cubic centimeter and the thickness of the titanium wall of the anode for example was about forty mils and the titanium wall area about two square centimeters. The residual gas pressure at room temperature was about $10^{-9}$ millimeters of mercury.

It will be apparent that the invention may be carried out on a very different scale from that indicated in the particular example given and that the rate of flow of gas will be determined by the volume of furnace as well as the number and size of the devices being processed. A conveyerized furnace may be employed. The actual temperature utilized for making the bond between the ceramic and the metal parts will likewise depend upon the particular materials involved and the sealing method employed. It will be understood that the device will be brought up to sealing temperature on a heating schedule that allows adequate time for degassing the parts and activating the cathode if it is of a type requiring activation. The device will then be cooled to complete the seal and the atmosphere surrounding the sealed device changed by flushing with a rare gas to reduce the partial pressure of hydrogen and effect the removal of the hydrogen from the interior of the device by the action of the titanium group metal. The metal of the wall portion through which the hydrogen passes should have the characteristic of sorbing more hydrogen at relatively low temperature than at higher temperatures. The flushing of the exterior of the envelope is then carried out at a temperature at which the sorption is relatively low as compared with the sorption at the operating temperature of the device. For titanium the sorption of hydrogen decreases rapidly in the range of 600° C. to 800° C. and remains low for temperatures above that. Titanium is therefore very useful for making devices which are sealed at a temperature above 700° C. and operated at temperatures below 700° C. For any given device there will be, of course, a substantial interval between the sealing temperature and the operating temperature.

In the foregoing description the wall portion of titanium group metal is a part of one of the electrode terminals. While this is a preferred form of device it will be apparent that the metal may form a separate window or even take the form of a tubulation which may be removed after the discharge device is completely processed.

While dry hydrogen is a preferred gas for the initial processing of the device other gases which are largely hydrogen may be employed if desired provided the additional constituents of the gas are not detrimental to the process. This aspect of process is more fully described and claimed in the aforementioned DeSantis et al. application, Serial No. 631,321, filed December 28, 1956. Also while argon is a preferred gas, rare gases such as xenon, krypton and neon may be used, if desired.

While a particular embodiment of the invention has been described it will be apparent that changes and modifications may be made without departing from our invention in its broader aspects and we aim, therefore, in the appended claims to cover all such changes and modifications as fall within the true spirit and scope of our invention.

What we claim as new and desire to secure by Letters Patent of the United States is:

1. The method of evacuating and assembling a vacuum-tight envelope including a stack of insulating and metal members having at least one wall portion thereof consisting of a metal selected from the group consisting of titanium, zirconium, hafnium, thorium, vanadium and palladium which comprises heating said stack while subjected to an atmosphere consisting essentially of hydrogen both inside and out, continuing the heating to a temperature sufficient to effect melting at the junction of the metal and insulating parts and allowing the stack to cool sufficiently to solidify the junctions, flushing the volume surrounding the envelope with a rare gas while maintaining the enclosure at a high temperature but below the melting temperature of the junctions to pass hydrogen within the envelope through said wall portion and allowing the envelope to cool, and sorbing residual hydrogen from within said envelope by said wall portion as the device cools.

2. The method of evacuating and assembling a vacuum-tight envelope including a stack of ceramic insulating and interposed titanium metal members with nickel shims interposed between said ceramic and titanium members which comprises heating said stack while subjected to an atmosphere consisting essentially of hydrogen both inside and out to a temperature of about 950° C., continuing the heating to a temperature of about 1035° C. to effect alloying at the junctions of the titanium metal and nickel shims and wetting of the ceramic insulating parts and allowing the stack to cool sufficiently to solidify the junctions, flushing the volume surrounding the envelope with a rare gas while maintaining the closure at a temperature above 700° C. but below 1035° C. to pass hydrogen within the envelope through the titanium metal member and allowing the envelope to cool, and sorbing residual hydrogen from within said envelope by said wall portion as the device cools.

3. The method of evacuating an envelope having an opening therein and including at least one wall portion consisting of a metal selected from the group consisting of titanium, zirconium, hafnium, thorium, vanadium and palladium which comprises heating said envelope while subjected to an atmosphere of hydrogen both inside and out, sealing the opening, flushing the volume surrounding the envelope with a rare gas while maintaining the envelope at a high temperature but below the temperature at which the opening is sealed to pass the hydrogen within the envelope through said wall portion and allowing the envelope to cool, and sorbing residual hydrogen from within said enclosure by said wall portion as the device cools.

4. The method of evacuating an envelope having an opening therein and including at least one wall portion consisting of titanium, which comprises heating said envelope while subjected to an atmosphere of hydrogen both inside and out, sealing the opening, flushing the volume surrounding the envelope with argon while maintaining the envelope at a high temperature but below the temperature at which the opening is sealed to pass the hydrogen within the envelope through said wall portion and allowing the envelope to cool, and sorbing residual hydrogen from within said enclosure by said wall portion as the device cools.

5. The method of evacuating an envelope having an opening therein and including at least one wall portion thereof consisting of a metal selected from the group consisting of titanium, zirconium, hafnium, thorium, vanadium and palladium which comprises placing the envelope in an enclosure and heating it while subjected to an atmosphere of hydrogen both inside and out to degas the parts, sealing the opening, flushing the enclosure with a rare gas while maintaining the envelope at a high temperature but below the melting temperature of the seal to pass the hydrogen within the envelope through said wall portion and allowing the envelope to cool, the wall portion being effective to sorb residual hydrogen within said enclosure.

No references cited.